US010616314B1

(12) United States Patent
Plenderleith et al.

(10) Patent No.: US 10,616,314 B1
(45) Date of Patent: Apr. 7, 2020

(54) DYNAMIC SOURCE ROUTING FOR DATA TRANSFER

(71) Applicant: Amazon Technologies, Inc., Seattle, WA (US)

(72) Inventors: Jamie Plenderleith, Dublin (IE); Donagh Edward Hatton, Kildare (IE)

(73) Assignee: Amazon Technologies, Inc., Seattle, WA (US)

( * ) Notice: Subject to any disclaimer, the term of this patent is extended or adjusted under 35 U.S.C. 154(b) by 150 days.

(21) Appl. No.: 14/983,046

(22) Filed: Dec. 29, 2015

(51) Int. Cl.
*H04L 29/08* (2006.01)
*H04L 12/26* (2006.01)
*H04L 29/06* (2006.01)

(52) U.S. Cl.
CPC .......... *H04L 67/1008* (2013.01); *H04L 43/08* (2013.01); *H04L 63/12* (2013.01); *H04L 67/16* (2013.01)

(58) Field of Classification Search
CPC ......... H04L 45/34; H04L 43/08; H04L 67/16; H04L 47/122; H04L 47/125
USPC ........................................................ 709/224
See application file for complete search history.

(56) References Cited

U.S. PATENT DOCUMENTS

| | | | |
|---|---|---|---|
| 6,910,078 B1 * | 6/2005 | Raman | H04L 29/06027 709/231 |
| 9,645,974 B1 | 5/2017 | Patil et al. | |
| 2002/0065922 A1 * | 5/2002 | Shastri | H04L 29/06 709/227 |
| 2005/0125369 A1 | 6/2005 | Buck et al. | |
| 2008/0222243 A1 * | 9/2008 | Shaw | H04L 65/4069 709/203 |
| 2009/0157850 A1 * | 6/2009 | Gagliardi | G06F 17/30864 709/219 |
| 2010/0017351 A1 | 1/2010 | Hench | |
| 2012/0054265 A1 * | 3/2012 | Kazerani | H04L 43/0811 709/203 |

(Continued)

OTHER PUBLICATIONS

International Search Report and Written Opinion dated Apr. 3, 2017, issued in corresponding PCT/US2016/068818.

(Continued)

*Primary Examiner* — Thomas J Dailey
*Assistant Examiner* — Lam H Duong
(74) *Attorney, Agent, or Firm* — Knobbe Martens Olson & Bear, LLP (57) ABSTRACT

A computer implemented system and method is provided for managing sources of data transfer from a content delivery network (CDN) service provider to a client device. Illustratively, the data transfer is initialized between a first endpoint of the CDN and the client device. While the data transfer is ongoing between the first endpoint and the client device, the system receives performance information regarding alternative endpoints which may replace the first endpoint as the source for the ongoing data transfer. The performance information may be generated by the client device that probes alternative endpoints, or may be generated by dedicated monitoring nodes deployed on the network. Should a change of data transfer source be desirable, the system may cause the first endpoint to stop data transmission and cause a selected alternative endpoint to continue the ongoing data transfer to the client in accordance with a current progress of the data transfer.

19 Claims, 5 Drawing Sheets

(56) References Cited

U.S. PATENT DOCUMENTS

| | | |
|---|---|---|
| 2013/0179722 A1 | 7/2013 | Smith et al. |
| 2014/0089232 A1 | 3/2014 | Buibas et al. |
| 2014/0156575 A1 | 6/2014 | Patil et al. |
| 2014/0277718 A1 | 9/2014 | Izhikevich |
| 2015/0046332 A1 | 2/2015 | Adjaoute |
| 2016/0217367 A1 | 7/2016 | Moreno et al. |
| 2016/0342891 A1 | 11/2016 | Ross et al. |
| 2016/0342893 A1 | 11/2016 | Ross et al. |

OTHER PUBLICATIONS

Seide, Frank, et al. "On Parallelizability of Stochastic Gradient Descent for Speech DNNS" 2014 IEEE International Conference on Acoustic, Speech, and Signal Processing (ICASSP), 5 pages.

* cited by examiner

DYNAMIC SOURCE ROUTING FOR DATA TRANSFER

BACKGROUND

Generally described, computing devices and communication networks can be utilized to exchange information. In a common application, a device can request content from another device via the communication network. For example, a user at a personal computing device can utilize a software browser application to request a Web page or Web application from a server device via the Internet. For another example, a user of a content providing service can utilize a display device (e.g., television, computer, mobile device, smartphone, tablet) to request content (e.g., an audio presentation, video presentation, audiovisual presentation, movie, television show, video, podcast) to be downloaded or streamed from a server device via the Internet to the display device. In such embodiments, the user computing device or display device can be referred to as a client device and the server device can be referred to as a content provider.

Content providers are generally motivated to provide requested content to client devices often with consideration of cost, speed, or efficiency associated with the transmission of the content data. For larger scale implementations, a content provider may receive content requests from a high volume of client devices which can place a strain on the content provider's computing resources. Additionally, the content requested by the client devices may have a number of components, which can further place additional strain on the content provider's computing resources.

With reference to an illustrative example, content to be downloaded or streamed to the client device to be presented to the user may be identified by one or more embedded resource identifiers, such as uniform resource locators ("URLs"). In turn, software on the client devices typically processes embedded resource identifiers to generate requests for the content. Often, the resource identifiers reference a computing device associated with the content provider such that the client device would transmit the request for the content to the referenced content provider computing device. Accordingly, in order to satisfy a content request, the content provider would provide client devices data associated with the content.

Some content providers attempt to facilitate the delivery of requested content data through the utilization of a content delivery network ("CDN") service provider. A CDN server provider typically maintains a number of computing devices in a communication network that can maintain content data from various content providers. In turn, content providers can instruct, or otherwise suggest to, client devices to request some, or all, of the content provider's content from the CDN service provider's computing devices.

With reference to the previous illustrative example, the content provider can leverage a CDN service provider with the modification or substitution of resource identifiers associated with the embedded resources. Specifically, the resource identifiers can reference a computing device associated with the CDN service provider such that the client device would transmit the request for corresponding resources to the referenced CDN service provider computing device. The CDN service provider may determine a source endpoint (e.g., a server) within the CDN for transferring requested data to the client device. Typically, this determination is made prior to the initiation of data transfer and the source of data transfer does not change during the data transfer process.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, the present disclosure is directed to transferring data in response to content or resource requests from a client device. In one aspect, a content delivery network ("CDN"), maintaining a plurality of computing devices that are capable of delivering content data to client devices, utilizes a direct server response to allow the CDN to utilize different sources to deliver requested content data to a client once data transfer between server and client is established. In another aspect, the client device can measure performance information regarding data communications to facilitate the determination of whether the CDN should switch content sources.

In accordance with an illustrative embodiment, a client device requests content associated with a content provider. The content provider, utilizing a CDN service provider, causes the client device to request the content directly from a point of presence ("POP") maintained by the CDN service provider. In turn, a first endpoint at the POP receives the request, establishes a type of communication context (e.g., a downloading session based on certain communication protocol) with the client device, and begins transmitting content data (e.g., downloading a large file corresponding to a content request) to the client device in accordance with the communication context. During the receipt of content data from a first endpoint, the client device can be configured to probe one or more alternative endpoints associated with the CDN service provider to determine download speed, latency, or other performance information associated with the alternative endpoint(s). The probing may include downloading a chunk of data (e.g., a data portion included in or related to the content request) from the alternative endpoint to gauge its potential performance as a source for content data transfer. The client device may provide the performance information of alternative endpoint(s) to a source management service.

In accordance with additional aspects, while the first endpoint is transferring data to the client device, the first endpoint may periodically provide updates on the data transfer progress to the source management service, which may be associated with a datastore shared across the CDN and maintains data transfer progress information (e.g. SessionId, client IP, TCP sequence number, filename, last reported byte progress, etc.). During the data transfer, the source management service may identify an alternative endpoint more suitable to serve as the data transfer source, based on endpoint performance information provided by the recipient client device or other client devices. The source management service may further effectuate or cause a change of data transfer source from the first endpoint to the identified alternative endpoint, using corresponding data transfer progress information. In some embodiment, the change of the endpoints of the CDN utilized to transfer portions of the requested data can be achieved without requiring that the client device transmit a subsequent request for the data to a new endpoint or that the client device be aware of a change in transmitting endpoint prior to the change. For example, the source management service can utilize a direct server response protocol to cause the alternative endpoint to begin transmitting portions of the data to the client device. In some embodiments, the source management service or another service/system may analyze the data transfer progress information reported from endpoints to determine data transfer completion rate, progress information associated with data transfer cancellations or dropped off communications. Such information may be further provided to the CDN service provider to improve its service.

Illustratively, the source management service requests the first endpoint to provide an update on data transfer progress or processes the currently available data transfer progress information. The source management service then facilitates a transition to an alternate endpoint by instructing the first endpoint to stop the data transfer, and then instructing the identified alternative endpoint to continue sending the same content data to the client device at a current progress position in accordance with the data transfer progress information. Illustratively, the identified alternative endpoint continues the data transfer via the same communication context (e.g., a same downloading session) that was established between the first endpoint and the client. In some embodiments, the change of data transfer source may be triggered by a request or notification from the client, such as a HTTP/AJAX request from a web browser. In other embodiments, the change of source is implemented without any request or interaction from the client device, that is, the data transfer traffic to the client device switches automagically from the first endpoint to the identified alternative endpoint.

In some embodiments, the source management service receives performance information of endpoints from a plurality of monitoring nodes (e.g., hardware monitoring devices or software monitoring agents deployed around the globe) and uses this information as a basis for identification of alternative endpoint(s) potentially more suitable than the first endpoint to serve as data transfer source. Individual monitoring nodes may periodically probe various endpoints of the CDN using techniques (e.g., trace routes, ICMP pings, rich metrics queries, etc.) different from client device based probing. The source management service may consolidate performance information received from the monitoring nodes into a network weather map, which can be constantly updated to reflect performance of endpoints with respect to various geographic areas or network locations. In these embodiments, the source management service may verify performance information provided by probing client devices against performance information provided by monitoring nodes, for example, to rule out noise or malicious behavior of comprised client device. In some embodiments, the source management service identifies alternative endpoint(s) and determines the need for change of data transfer source based further on service interruption schedule, reports, or predictions obtained from other relevant components of the CDN.

Although various aspects of the disclosure will be described with regard to illustrative examples and embodiments, one skilled in the art will appreciate that the disclosed embodiments and examples should not be construed as limiting.

Figure 1:
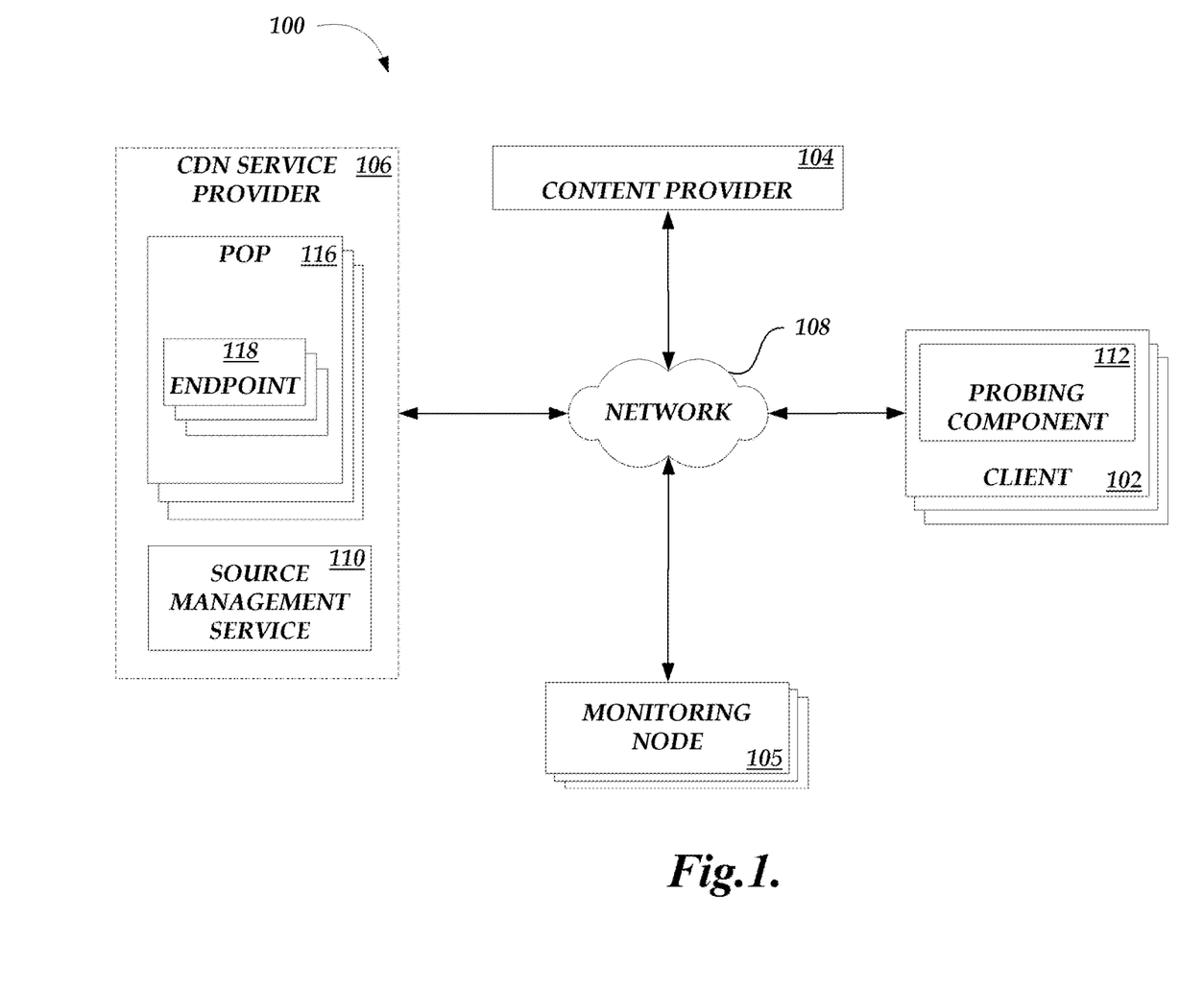
FIG. 1 is a block diagram illustrative of a data communication environment including a number of client computing devices, a content provider, a CDN service provider, and a number of monitoring nodes.

FIG. 1 is a block diagram illustrative of a data communication environment 100 including a number of client computing devices 102, a content provider 104, a CDN service provider 106, and a number of monitoring nodes 105 that are interconnected via a communication network 108. The client computing devices 102 (generally referred to as "clients") can correspond to a wide variety of devices including personal computing devices, laptop computing devices, hand-held computing devices, terminal computing devices, mobile devices (e.g., smartphones, tablets), wireless devices, various electronic devices (e.g., televisions) and appliances, and the like. In an illustrative embodiment, the client devices 102 include necessary hardware and software components for establishing communications over the communication network 108. For example, the client devices 102 may be equipped with networking equipment and browser software applications that facilitate communications via the Internet or an intranet.

In particular, individual client computing devices 102 may include a probing component 112 implemented in either hardware or software (e.g., executable code running inside or outside of a web browser). The probing component 112 may be configured to receive identification or routing information regarding alternative endpoints from the CDN service provider 106, generate and transmit queries or other probing requests to the alternative endpoints, receive responses from the alternative endpoints, and/or perform other related functionalities as disclosed herein.

The network 108 can be a publicly accessible network of linked networks, possibly operated by various distinct parties, such as the Internet. In some embodiments, the network 108 may include a private network, personal area network ("PAN"), LAN, WAN, cable network, satellite network, any other medium of computer data transfer, or some combination thereof.

As also illustrated in FIG. 1, the data communication environment 100 includes the content provider 104 configured to communicate with the one or more client devices 102 via the communication network 108. The content provider 104 illustrated in FIG. 1 comprises a logical association of one or more computing devices associated with the content provider. By way of example, the content provider 104 can include web server components corresponding to one or more server computing devices for obtaining and processing requests for content from the client devices 102. The content provider 104 can further comprise an origin server component and associated storage component corresponding to one or more computing devices for obtaining and processing requests for network resources from the CDN service provider 106.

With continued reference to FIG. 1, the data communication environment 100 includes the CDN service provider 106. The CDN service provider 106 illustrated in FIG. 1 comprises a logical association of one or more computing devices associated with the CDN service provider 106. Specifically, the CDN service provider 106 can comprise a number of point of presence ("POP") locations 116, which also can be generally referred to as point of delivery locations or "PODs," that correspond to nodes on the communication network 108. Each CDN POP 116 may comprise at least one endpoint 118 (e.g., servers, hosts, network interface controllers or NICs coupled to the communication network 108). Each POP 116 (or endpoint 118) may further include or be associated with at least one resource cache component, which may include a plurality of cache server computer devices organized in a cache server hierarchy. The resource cache component(s) may include hardware or software components for tracking the expiration of resources stored on behalf of one or more various content providers 104. In an illustrative embodiment, although the POPs 116 are illustrated in FIG. 1 as logically associated with the CDN service provider 106, the POPs can be geographically distributed throughout the communication network 108 in a manner to best serve various demographics of client devices 102.

The CDN service provider also includes a source management service 110. The source management service 110 may be implemented as software on one or more physical servers or other computing machines, each of which includes a hardware processor and a memory. In some embodiments, the source management service 110 may be implemented on one or more virtual machines, rather than on dedicated servers. The source management service 110 may be configured to communicate with clients 102, POPs 116 or their associated endpoints 118, and monitoring nodes 105. The source management service 110 may compile, integrate, and analyze endpoint performance information, and identify alternative endpoints to potentially serve as the source for ongoing data transfers. Additionally, one skilled in the relevant art will appreciate that the CDN service provider 106 can be associated with various additional computing resources, such as additional computing devices for administration of content and resources, and the like. Still further, one skilled in the relevant art will appreciate that the resource cache components associated with the CDN service provider 106 may be provided by different service providers, independently or on behalf of content provider 104 or CDN server provider 106.

With continued reference to FIG. 1, the data communication environment 100 further includes the monitoring nodes 105. Individual monitoring nodes 105 may be implemented on one or more physical servers or other computing machines, each of which includes a hardware processor and a memory. The monitoring nodes 105 may also be implemented on one or more virtual machines, rather than on dedicated servers. The monitoring nodes 105 may include dedicated hardware or software configured to probe various endpoints or areas of the CDN at predetermined time intervals (e.g., every 30 seconds). In some embodiments, the monitoring nodes 105 may be deployed across the network 108 to monitor the performance, health, efficiency, or other aspects of the CDN from different geographic or network locations. As will be described in detailed below, the monitoring nodes 105 may be utilized to collect network performance information in conjunction with the client devices 102 or in lieu of client devices 102.

Figure 2:
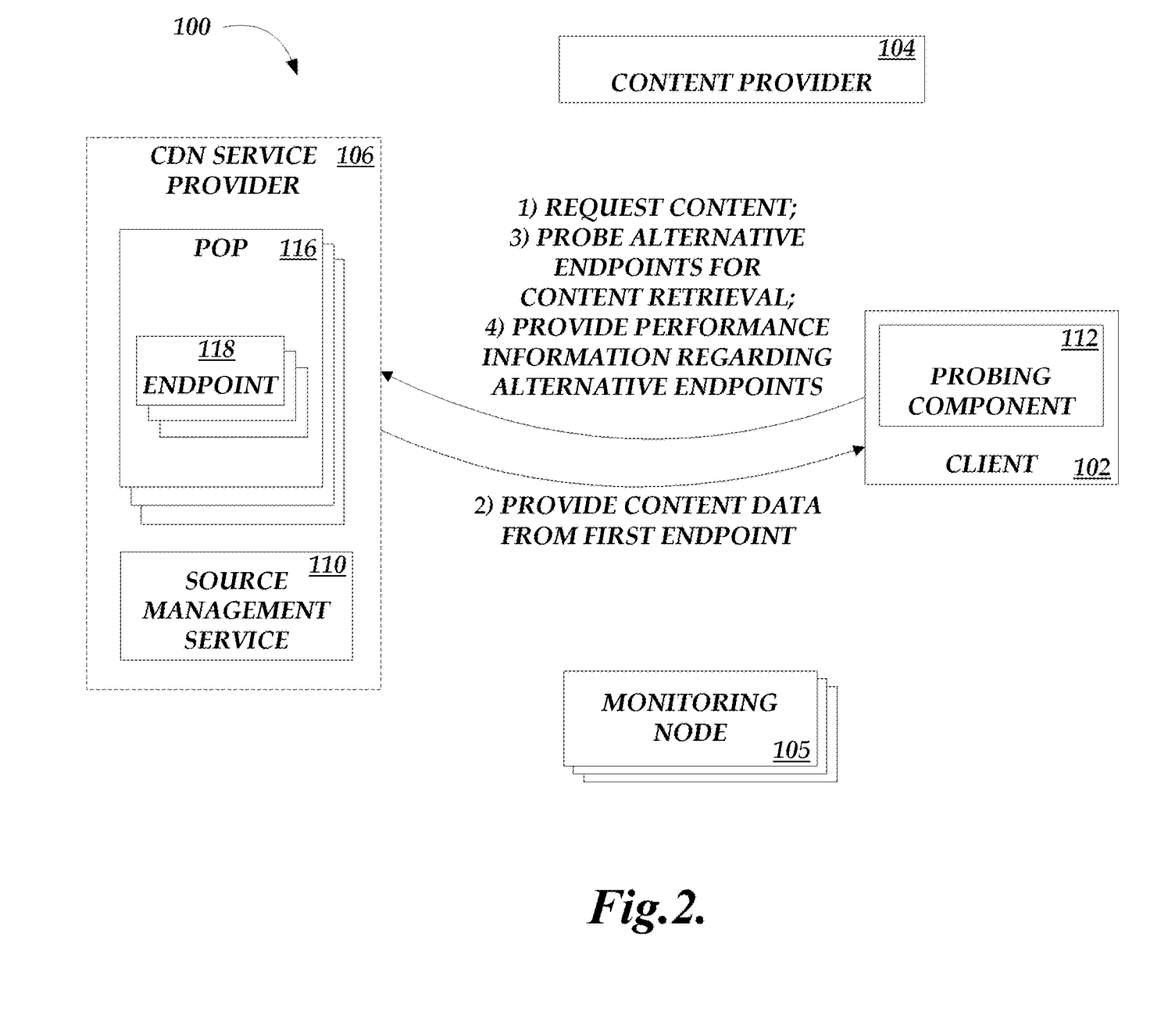
FIG. 2 is a block diagram of the data communication environment of FIG. 1 illustrating content data being transferred from first endpoint in response to a client request from a client computing device.

FIG. 2 is a block diagram of the data communication environment 100 of FIG. 1 illustrating content data being transferred from a first endpoint 118 in response to a request from a client computing device 102. At (1), the client 102 transmits a request for content (e.g., based on corresponding embedded resource identifiers received from the content provider 104) to the CDN service provider 106. The CDN service provider may determine a POP or its associated endpoint for responding to the content request. In some embodiments, the determination can be based on current resource availability, performance (e.g., latency, network speed, error rate, routing cost, etc.), service schedule, or the like, of various POPs or their associated endpoints. In some embodiments, the responding POP/endpoint is predetermined and indicated/mandated by the request for content (e.g., as a portion of a URL included in the request). In some embodiments, the CDN service provider may provide routing information (e.g., network addresses, domain/subdomain names, etc.) for the determined endpoint (i.e., the first endpoint 118) in one or more corresponding DNS responses to the client.

In some embodiments, the CDN service provider may also determine one or more alternative endpoints for probing by the client, and may provide routing information for the alternative endpoint(s) to the client via DNS response(s). In other embodiments, the routing information for alternative endpoints can be requested at a later time by the client, for example, based on executable code (e.g., javascript embedded in a corresponding downloading or streaming Web page/application) that the client has accessed or is accessing.

At (2), the CDN service provider 106 starts providing content data from the first endpoint 118 to the client 102. Illustratively, the client or the first endpoint establishes a network communication channel between the two in accordance with an applicable communication protocol. The first endpoint then starts transmitting data to the client via a corresponding network path, where the first endpoint serves as the source of data transfer and the client serves as the destination.

At (3), while receiving data from the first endpoint 118, the client 102 probes one or more alternative endpoints associated with the CDN service provider 106 to determine their associated download speed, latency, or other performance information. As discussed above, the client may have received routing information for the alternative endpoints via DNS responses. Alternatively or in addition, the client may execute code or script, either inside or outside of a web browser, to retrieve routing information for alternative endpoints from the CDN service provider and perform the probing. The probing may include downloading a chunk of data (e.g., a certain sized data portion included in or related to the content request) from individual alternative endpoints to gauge their respective performance as a source for content data transfer.

At (4), the client 102 reports the performance information of alternative endpoint(s) to the CDN service provider 106. In some embodiments, the client may determine whether to perform the probing and/or reporting based on the performance of the first endpoint as the current data transfer source. In some embodiments, the client may conduct the probing and reporting of alternative endpoints at periodic or aperiodic intervals during the ongoing data transfer. In some embodiments, the CDN service provider may expose different subsets of alternative endpoints (with or without overlapping among the subsets) at different times for client probing during the ongoing data transfer. In some embodiments, the client may analyze the performance of the alternative endpoints, and only identify and report those that may perform better than the first endpoint as the data transfer source.

Figure 3:
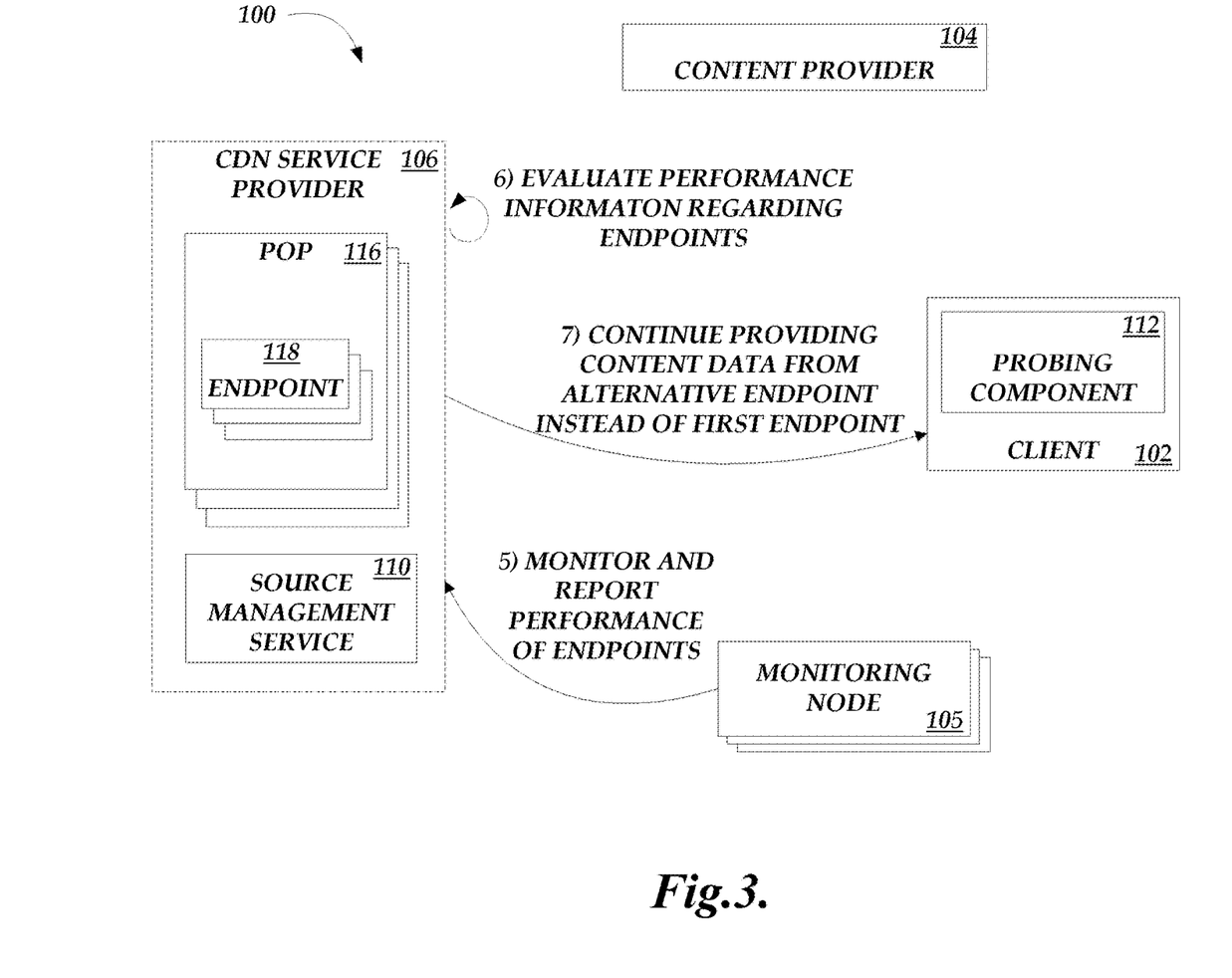
FIG. 3 is a block diagram of the data communication environment of FIG. 1 illustrating continued content data transfer from an alternative endpoint after evaluation of endpoint performance.

FIG. 3 is a block diagram of the data communication environment 100 of FIG. 1 illustrating continued content data transfer from an alternative endpoint after evaluation of endpoint performance. At (5), a plurality of monitoring nodes 105 monitor and report performance of various endpoints associated with the CDN service provider 106. Individual monitoring node may maintain or have access to a list of all or some subset of endpoints associated with the CDN service provider, each entry of the list can comprise a network address for the endpoint or other information that uniquely identifies the endpoint. The monitoring node may periodically (e.g., every 30 seconds) probe various endpoints on the list using similar or different techniques (e.g., trace routes, ICMP pings, rich metrics queries, etc.) than client device based probing. In some embodiments, each probing attempt from a monitoring node to an endpoint includes retrieving a file or data portion that is different in size or content from previous probing attempts (e.g., probing attempts made during the past 24 hours). Randomizing the probing attempts in this way may avoid or reduce performance noise caused by cached data, which may be stored or accessed anywhere on the network path between endpoint(s) and the monitoring node.

In addition to performance information, the monitoring nodes may query endpoints for their health information, such as operational status of the endpoint, versions of the content stored by the endpoint (e.g., parcel versions), indication of whether the content stored by the endpoint is stale or not (e.g., beyond a predetermined threshold level), quality of service (e.g., compression rates, processing power, processing speed, and/or bandwidth), or the like. Each monitoring node may then report the monitored endpoints performance (and health) information to the CDN service provider.

At (6), the CDN service provider 106 evaluates performance information regarding various endpoints. The CDN service provider may consolidate performance information (and applicable health information) received from the monitoring nodes into a network weather map, which can be constantly updated to reflect performance (or health) of endpoints with respect to various network or geographic locations where the monitoring nodes reside. Illustratively, the network weather map may correspond to a graph, which includes endpoints and monitoring nodes as vertices, and performance metrics that characterize any edges between them. Various data mining or machine learning techniques can be applied to the network weather map in order to predict performance of particular endpoints with respect to particular geographic or network locations at a future time.

In some embodiments, the CDN service provide may verify performance information provided by the client against performance information provided by monitoring nodes residing in some geographic or network proximity of the client. If the information provided by the client contradicts the information provided by the monitoring nodes, the CDN service provider may ignore or discount the client provided information. Based on the performance evaluation of various endpoints (whether relying on information provided by monitoring nodes, the client, or some combination of the two), the CDN service provider may identify alternative endpoint(s) which may provide better performance or lower cost than the first endpoint to serve as the data transfer source. It should be noted that the identified alternative endpoint(s) may be associated with the same or a different POP than the first endpoint.

At (7), the CDN service provider 106 continues providing content data to the client 102 from an alternative endpoint instead of the first endpoint. As discussed above, while the first endpoint is transferring data to the client, the first endpoint may periodically report progress information of the data transfer (e.g. SessionId, client IP, TCP sequence number, filename, last reported byte progress, or the like) to the CDN service provider. After identifying a more suitable alternative endpoint at (6), the CDN service provider may change the source of data transfer from the first endpoint to the identified alternative endpoint, using corresponding data transfer progress information. Illustratively, the CDN service provider requests the first endpoint to provide an update of data transfer progress or processes the currently available data transfer progress information. The CDN service provider then requests the first endpoint to stop the current data transfer, and requests the identified alternative endpoint to continue sending the same data (e.g., starting from the last reported byte progress) to the client device (e.g., using the last reported TCP sequence number) in accordance with the data transfer progress information. The change of data transfer source may cause some redundant data (e.g., packets with TCP sequence numbers already used by the first endpoint by not yet reported in progress information), which may be discarded by the client in accordance with the underlying communication protocol.

In some embodiments, the change of source may be triggered by a request or notification from the client, such as a HTTP/AJAX request from a web browser. In other embodiments, the change of source is implemented without any request or interaction from the client device, that is, the source of data transfer traffic to the client device switches automagically from the first endpoint to the identified alternative endpoint. The change of source may or may not improve or otherwise change the latency, speed, reliability, cost, or other aspects of the data transfer as compared with the first endpoint as the source. After the source change, the client may continue probing alternative endpoints as it does at (3) for additional source change possibilities, until data transfer in response to the content request is completed.

Figure 4:
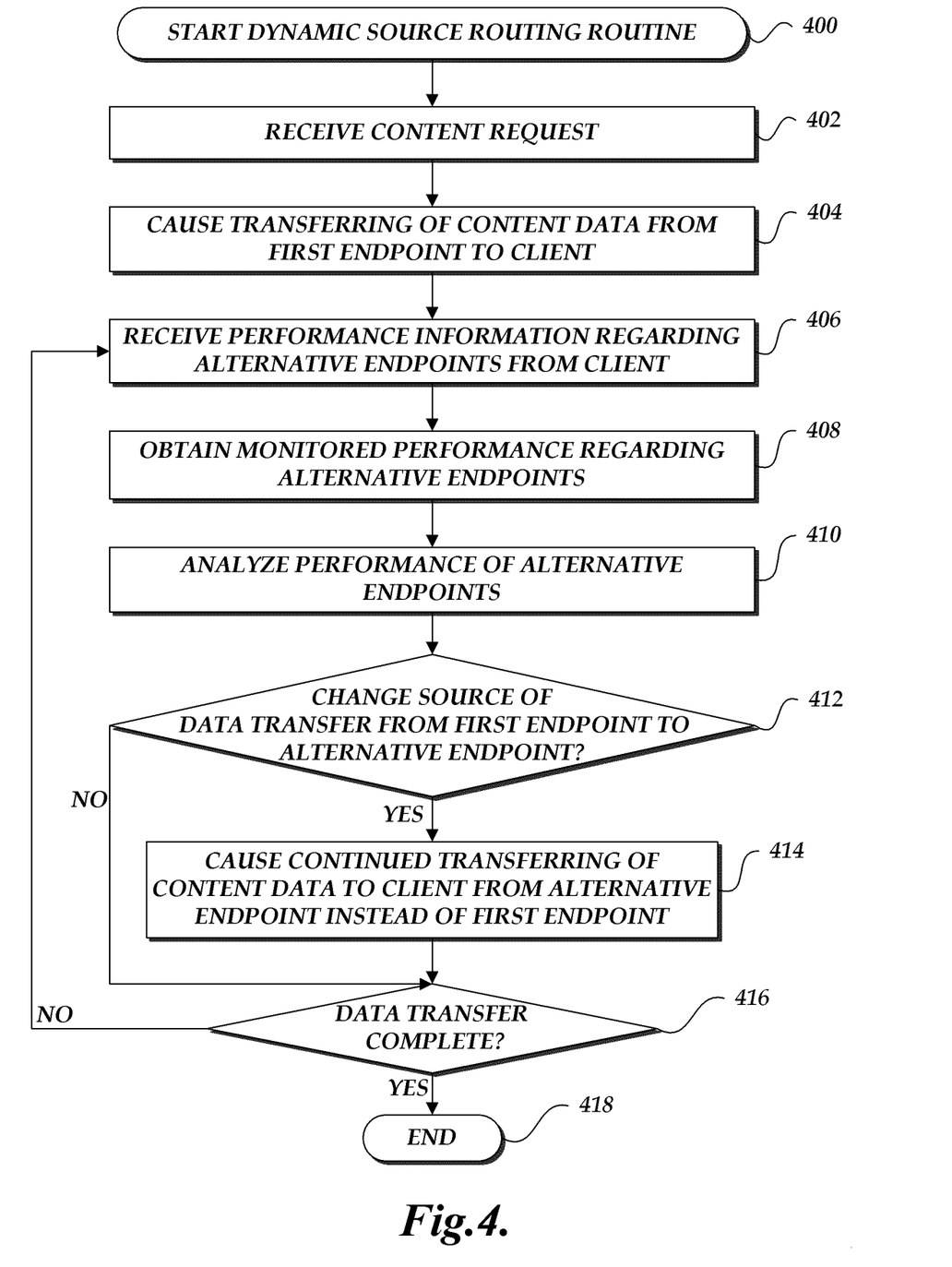
FIG. 4 is a flowchart illustrative of a dynamic source routing routine implemented by a source management service.

FIG. 4 is a flowchart illustrative of a dynamic source routing routine implemented by an example source management service 110. The routine starts at block 400. At block 402, the source management service 110 receives a request for content from a client computing device 102. The request may include one or more preceding queries (e.g., DNS queries) for routing information regarding endpoints associated with the CDN service provider 106 that may provide content data as requested. The source management service may determine a first endpoint 118 for responding to the content request. In some embodiments, the determination can be based on current resource availability, performance (e.g., latency, network speed, error rate, routing cost, etc.), service schedule, or the like, of various POPs or their associated endpoints. In some embodiments, the responding POP or endpoint is predetermined and indicated/mandated by the request for content (e.g., as a portion of a corresponding URL). The source management service may provide routing information (e.g., network addresses, domain/subdomain names, etc.) for the determined first endpoint in response to the client's routing query (e.g., via DNS resolution and response).

In some embodiments, the source management service may also determine one or more alternative endpoints for probing by the client, and may include routing information for the alternative endpoint(s) in the response to client's routing query. In other embodiments, the routing information for alternative endpoints may be provided to the client at a later time upon client request. Illustratively, the client request regarding alternative endpoints may be generated in accordance with executable code (e.g., javascript embedded in a corresponding downloading or streaming Web page/application) that the client has accessed or is accessing.

At block 404, the source management service 110 causes transferring of content data from the first endpoint 118 to the client 102. Illustratively, the client processes the routing information and establishes a network communication channel with the first endpoint based on an applicable communication protocol (e.g., HTTP, FTP, or the like). The first endpoint then starts transmitting data to the client via a corresponding network path, where the first endpoint serves as the source and the client serves as the destination. While transferring data to the client, the first endpoint may periodically report progress information of the data transfer (e.g. SessionId, client IP, TCP sequence number, filename, last reported byte progress, or the like) to the source management service.

At block 406, the source management service 110 receives performance information regarding alternative endpoints from the client 102. The alternative endpoints may correspond to endpoints associated with the same or different POP that the first endpoint is associated with. Also, the alternative endpoints may reside in the same or different geographic region as the first endpoint. In some embodiments, the source management service receives from the client a preference or order over the reported alternative endpoints. In other embodiments, the source management service receives a request from the client to change the data transfer source, which may include a comparison against performance information regarding the first endpoint and/or the ongoing data transfer.

At block 408, the source management service 110 obtains performance information regarding alternative endpoints from a number of monitoring nodes 105. As discussed above, the monitoring nodes may be deployed around the globe for monitoring and reporting on performance of the CDN service provider from various geographic and/or network locations. In addition to performance information, the source management service 110 may also receive health information regarding various endpoints, such as operational status of the endpoint, versions of the content stored by the endpoint (e.g., parcel versions), indication of whether the content stored by the endpoint is stale or not (e.g., beyond a predetermined threshold level), quality of service (e.g., compression rates, processing power, processing speed, and/or bandwidth), or the like.

At block 410, the source management service 110 analyzes the performance of alternative endpoints. In some embodiments, the source management service 110 consolidates performance information (and applicable health information) received from the monitoring nodes into a network weather map, which can be constantly updated to reflect performance of endpoints with respect to various network or geographic locations where the monitoring nodes reside.

In some embodiments, the source management service 110 provides analysis results of applicable alternative endpoints to the client. For example, the source management service may select alternative endpoints that are currently performing or are predicted to perform better than the first endpoint as the source of data transfer, in terms of latency, transmission speed or cost, reliability, or the like. In some embodiments, the source management service 110 may provide the client an ordered list of the selected alternative endpoints with their respective performance attributes. In other embodiments, the source management service 110 can also provide information allowing the client to be aware of the measured performance or an indicator of performance. For example, the source management service 110 may include some sort of visual cue that may indicate to the client whether current data throughput exceeds a performance threshold (e.g., red indicative of not exceeding the threshold while green indicative of exceeding the threshold). Additional notifications or performance information may also be sent to third parties, such as network service providers, the content provider, and the like.

In some embodiments, the source management service 110 may verify or compare the performance information provided by the client against performance information provided by monitoring nodes 105 residing in some threshold geographic or network proximity of the client. If the client provided information contradicts information provided by the monitoring nodes, the source management service 110 may ignore or discount the client provided information. In other embodiments, the source management service 110 may compare current performance information provided by either the monitoring nodes 105 or the client against historical performance information, and determine whether the current performance information reflects an actual network condition or an anomaly. For example, the source management service 110 can utilize historical information to determine standard deviations to determine how the currently measured performance relates to historical measured performance. The source management service 110 may utilize a weighing algorithm such that information from the monitoring nodes 105 or specific client devices 102 (based on an attributed trust) may be given greater influence.

In accordance with further aspects of the present application, the source management service 110 can utilize the collected performance information, along with historical collected performance information, to generate information indicative of performance of at least portions of a network. Illustratively, the information indicative of performance can be in the form of a map of various endpoints associated with the CDN service provider and information indicative of collected performance information. Still further, the collected performance information can be cumulative collected information from multiple client devices in combination with information from other probing devices, such as monitoring nodes 105. In this embodiment, the source management service 110 can dynamically adjust the map based on continuously collected performance information. Various data mining or machine learning techniques can be applied to the network weather map in order to predict performance of particular endpoints with respect to particular geographic or network locations at a future time. Additionally, utilizing trend data, the map indicative of network performance can be utilized to identify trends indicative of improving network data throughput, degrading network data throughput, cascading network outages, and the like.

At block 412, the source management service 110 determines whether to change the source of data transfer from the first endpoint to an alternative endpoint. Based on the performance analysis of various endpoints (whether relying on information provided by monitoring nodes, the client, or some combination of the two), the source management service may identify one or more alternative endpoints which may provide better performance or lower cost than the first endpoint to serve as data transfer source. Depending on certain predefined rules or business logic on performance improvement or cost saving, the source management service 110 may determine whether a change of source is needed.

In some embodiments, the source management service may determine whether to change the source based on client input. For example, the client may provide preferences in selecting an alternative endpoint as a potential data transfer source, such as a particular range or combination of various performance or cost attributes. The source management service may determine whether there is any alternative endpoint meeting the client's preferences and thus appropriate for a change of data transfer source. Still further, in other embodiments, the source management service 110 may also consider financial criteria provided by the content provider regarding costs incurred to transmit the requested content to the client device. In one example, the source management service 110 may have financial thresholds that determine whether the content provider has authorized (or will authorize) the transmission of content from an alternative endpoint.

In some embodiments, the source management service may determine whether to change the source based on the current progress of data transfer (or a projected time or cost for completing the data transfer). For example, if a threshold percentage of content data has already been transferred to the client and a change of source is not likely to shorten download time by a threshold amount, the source management service may determine that a change of source is not needed. In some embodiments, the source management service may determine that a change of data transfer source is needed due to service interruptions or anomalies associated with the first endpoint. For example, the source management service may not have received any data transfer progress information (related to the client 102 or any other client) from the first endpoint for a threshold period of time. The source management service may determine that the first endpoint is in some way malfunctioning and a change of data transfer source is needed.

If the source management service 110 determines that a change of data transfer source is needed, the routine of FIG. 4 proceeds to block 414, where the source management service 110 causes continued transferring of content data to the client 102 from an alternative endpoint instead of the first endpoint. As discussed above, while the first endpoint is transferring data to the client, the first endpoint may periodically report progress information of the data transfer (e.g. SessionId, client IP, TCP sequence number, filename, last reported byte progress, or the like) to the source management service. After selecting an alternative endpoint from those identified at block 412, the source management service requests the first endpoint to provide an update of data transfer progress information or processes the currently available data transfer progress information. The source management service then requests the first endpoint to stop the current data transfer, and requests the selected alternative endpoint to continue sending the same data (e.g., starting from the last reported byte progress) to the client device (e.g., using the last reported TCP sequence number) in accordance with the data transfer progress information.

In some embodiments, the change of source may be triggered by a request or notification from the client, such as a HTTP/AJAX request from a web browser. For example, the request or notification can be transmitted from the client to the source management service at any time during the ongoing data transfer, and trigger the source change to an appropriate alternative endpoint. In other embodiments, the change of source is implemented without any request or interaction from the client device, that is, the data transfer traffic to the client device continues automagically from the identified alternative endpoint.

Upon completion of the data transfer source change, the routine of FIG. 4 proceeds to block 416, where the source management service 110 determines whether data transfer for the requested content is completed. If not, the routine of FIG. 4 proceeds from block 416 back to block 406, where the source management service 110 treats the current source endpoint in a similar way as the first endpoint, and continues to receive performance information regarding endpoints that are alternative to the current source endpoint. Referring back to block 416, if the content transfer is determined to be completed, the routine of FIG. 4 ends at block 418.

Referring back to block 412, if the source management service 110 determines that a change of data transfer source is not needed, the routine of FIG. 4 proceeds to block 416, where the source management service 110 determines whether the content data transfer is completed. If not, the routine of FIG. 4 proceeds from block 416 back to block 406, where the source management service 110 continues to receive performance information regarding alternative endpoints. Referring back to block 416, if the content transfer is determined to be completed, the routine of FIG. 4 ends at block 418.

Figure 5:
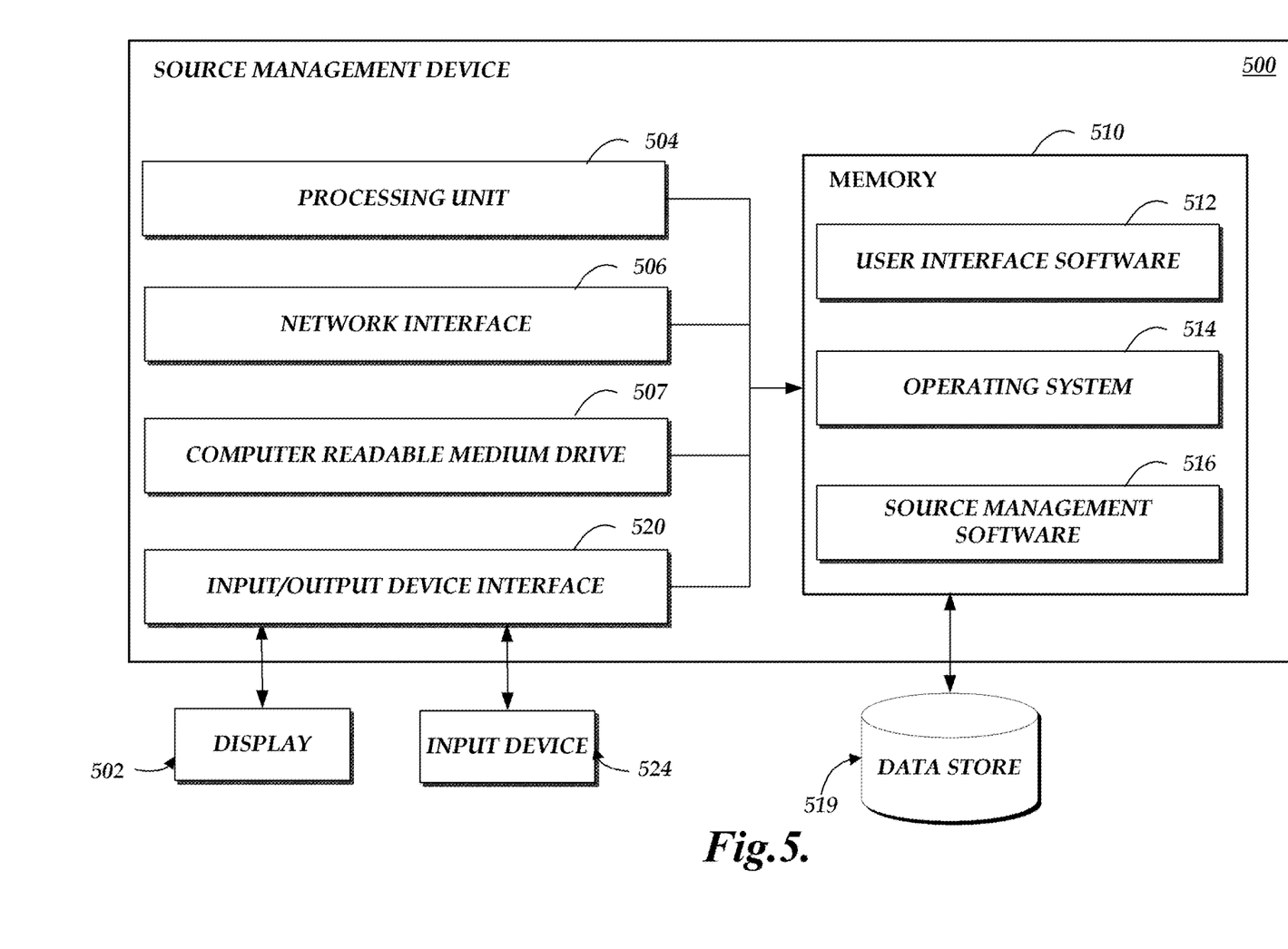
FIG. 5 is a block diagram depicting an illustrative computing device for implementing the source management service within the data communication environment of FIG. 1.

FIG. 5 is a block diagram depicting an illustrative source management device 500 for implementing the source management service 110 within the data communication environment 100 of FIG. 1. The general architecture of source management device 500 depicted in FIG. 5 includes an arrangement of computer hardware and software components that may be used to implement aspects of the present disclosure. As illustrated, the source management device includes a processing unit 504, a network interface 506, a computer readable medium drive 507, an input/output device interface 520, a display 502, and an input device 524, all of which may communicate with one another by way of a communication bus. The network interface 506 may provide connectivity to one or more networks or computing systems, such as the communication network 108 of FIG. 1. The processing unit 504 may thus receive information and instructions from other computing systems or services via a network. The processing unit 504 may also communicate to and from memory 510 and further provide output information for an optional display 502 via the input/output device interface 520. The input/output device interface 520 may also accept input from the optional input device 524, such as a keyboard, mouse, digital pen, etc. In some embodiments, the source management device may include more (or fewer) components than those shown in FIG. 5. For example, some embodiments of the source management device may omit the display 502 or input device 524, while providing input/output capabilities through one or more alternative communication channel (e.g., via the network interface 506).

The memory 510 may include computer program instructions that the processing unit 504 executes in order to implement one or more embodiments. The memory 510 generally includes RAM, ROM, and/or other persistent or non-transitory memory. The memory 510 may store an operating system 514 that provides computer program instructions for use by the processing unit 504 in the general administration and operation of the source management device 500. The memory 510 may further include computer program instructions and other information for implementing aspects of the present disclosure. For example, in one embodiment, the memory 510 includes user interface software 512 that generates user interfaces (and/or instructions therefor) for display upon a computing device, e.g., via a navigation interface such as a web browser installed on the computing device. In addition, memory 510 may include or communicate with one or more auxiliary data stores, such as data store 519.

In addition to the user interface module 512, the memory 510 may include source management software 516 that may be executed by the processing unit 504. In one embodiment, the source management software 516 implements various aspects of the present disclosure, e.g., receiving content requests for clients, causing data transfer from CDN endpoints to clients, analyzing endpoints performance, determining and causing change of data transfer sources. While the source management software 516 is shown in FIG. 7 as part of the source management device 500, in other embodiments, all or a portion of the software may be implemented individual or collectively by one or more alternative computing devices within the data communication environment 100.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware (e.g., application-specific logic circuitry), computer software executed by hardware, or combinations of both. To clearly illustrate this interchangeability of hardware and software, various illustrative components, blocks, modules, and steps have been described above generally in terms of their functionality. Whether such functionality is implemented as hardware, or as software executed by hardware, depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a computing device, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer implemented data transfer source management system configured to be used in conjunction with a content delivery network (CDN) service provider, which is configured to communicate with one or more client devices, the data transfer source management system comprising:
   an electronic data repository that stores data transfer progress information for one or more endpoints associated with the CDN service provider; and
   a computer system comprising one or more processors, the computer system configured to at least:
   receive a request for content from a client device;
   cause transferring of content data, during a communication session, from a first endpoint associated with the CDN service provider to the client device in response to the request, wherein the first endpoint provides data transfer progress information associated with the transferring of the content data to the electronic data repository;

receive, from the client device, first performance information regarding one or more alternative endpoints associated with the CDN service provider;

receive, from one or more monitoring nodes associated with the CDN service provider, second performance information indicative of characteristics of the one or more alternative endpoints, wherein the characteristics of the one or more alternative endpoints are independent of the client device;

determine that the first performance information received from the client device matches the second performance information received from the one or more monitoring nodes;

in response to determining that the first performance information matches the second performance information, analyze the first performance information regarding the one or more alternative endpoints;

identify, based at least in part on the analysis of the first performance information regarding the one or more alternative endpoints, a target alternative endpoint;

cause a cessation of the transferring of the content data from the first endpoint to the client device; and without a subsequent request from the client device, cause a continuation of the transferring of the content data, during the communication session, from the target alternative endpoint to the client device in accordance with the data transfer progress information associated with the transferring of the content data.

2. The computer implemented data transfer source management system of claim 1, wherein the data transfer progress information associated with the transferring of the content data comprises at least one of a SessionId, client IP, TCP sequence number, filename, or last reported byte progress.

3. The computer implemented data transfer source management system of claim 1, wherein the one or more alternative endpoints include at least one of a server, host, or network interface controller.

4. The computer implemented data transfer source management system of claim 1, wherein the first endpoint corresponds to a source of a network path for the transferring of the content data prior to the cessation of the transferring of the content data.

5. The computer implemented data transfer source management system of claim 1, wherein the target alternative endpoint corresponds to a source of a network path for the transferring of the content data upon the continuation of the transferring of the content data.

6. The computer implemented data transfer source management system of claim 1, wherein the one or more alternative endpoints include the target alternative endpoint.

7. A computer implemented method comprising:

responsive to a request from a client device, causing an ongoing data transfer to a client device from a first endpoint associated with a CDN service provider;

obtaining, by the CDN service provider from the client device, first performance information regarding a set of endpoints associated with the CDN service provider, the first performance information including progress information associated with the ongoing data transfer to the client device from the first endpoint;

obtaining, from one or more monitoring nodes associated with the CDN service provider, second performance information indicative of characteristics of the set of endpoints, wherein the characteristics of the set of endpoints are independent of the client device;

determining, by the CDN service provider, that the first performance information obtained from the client device matches the second performance information obtained from the one or more monitoring nodes;

in response to determining that the first performance information matches the second performance information, determining, by the CDN service provider, that the first endpoint should be replaced with an alternative endpoint associated with the CDN service provider for the ongoing data transfer based, at least in part, on the first performance information; and causing replacement of the first endpoint with the alternative endpoint in accordance with the progress information regarding the ongoing data transfer and without a request from the client device for the alternative endpoint.

8. The computer implemented method of claim 7, wherein the first performance information includes performance information regarding the first endpoint.

9. The computer implemented method of claim 7, wherein the first endpoint and the alternative endpoint are associated with different point of presence (POP) locations.

10. The computer implemented method of claim 7 further comprising providing routing information regarding the set of endpoints to the client device.

11. The computer implemented method of claim 7 further comprising analyzing the first performance information regarding the set of endpoints.

12. The computer implemented method of claim 11 further comprising providing feedback to the client device based on the analysis of the first performance information.

13. The computer implemented method of claim 7 further comprising receiving input from the client device as a basis for determining that the first endpoint should be replaced with an alternative endpoint.

14. The computer implemented method of claim 7 further comprising:

determining, by the CDN service provider, that the alternative endpoint should be replaced with a second alternative endpoint associated with the CDN service provider for the ongoing data transfer based, at least in part, on updated performance information regarding the set of endpoints, the updated performance information including updated progress information associated with transmission of content from the alternative endpoint associated with the CDN service provider and the client device; and causing replacement of the alternative endpoint with the second alternative endpoint in accordance with the updated progress information.

15. Non-transitory computer storage having stored thereon instructions that, when executed by a computer system comprising one or more processors, cause the computer system to:

obtain, from a client device, first performance information regarding a first set of endpoints associated with a CDN service provider;

obtain progress information regarding an ongoing data transfer from a source endpoint to the client device;

obtain, from one or more monitoring nodes associated with the CDN service provider, second performance information indicative of characteristics of the first set of endpoints, wherein the characteristics of the first set of endpoints are independent of the client device;

determine that the first performance information obtained from the client device matches the second performance information obtained from the one or more monitoring nodes;

in response to determining that the first performance information matches the second performance information, determine that the source endpoint should be replaced with an alternative endpoint associated with the CDN service provider for the ongoing data transfer based, at least in part, on the first performance information; and without a subsequent request from the client device, cause replacement of the source endpoint with the alternative endpoint in accordance with the progress information regarding an ongoing data transfer.

16. The non-transitory computer storage of claim 15, wherein the first performance information includes performance information related to the ongoing data transfer.

17. The non-transitory computer storage of claim 15, wherein the instructions further cause the computer system to receive third performance information regarding a second set of endpoints associated with the CDN service provider.

18. The non-transitory computer storage of claim 17, wherein the second set is a superset of the first set.

19. The non-transitory computer storage of claim 15, wherein the computer system causes the replacement of the source endpoint with the alternative endpoint in accordance with the progress information regarding the ongoing data transfer without a request from the client device to the alternative endpoint.

* * * * *